C. S. BEEBE.
ANTISKID TIRE AND STUD THEREFOR.
APPLICATION FILED JULY 19, 1909.
967,707.
Patented Aug. 16, 1910.
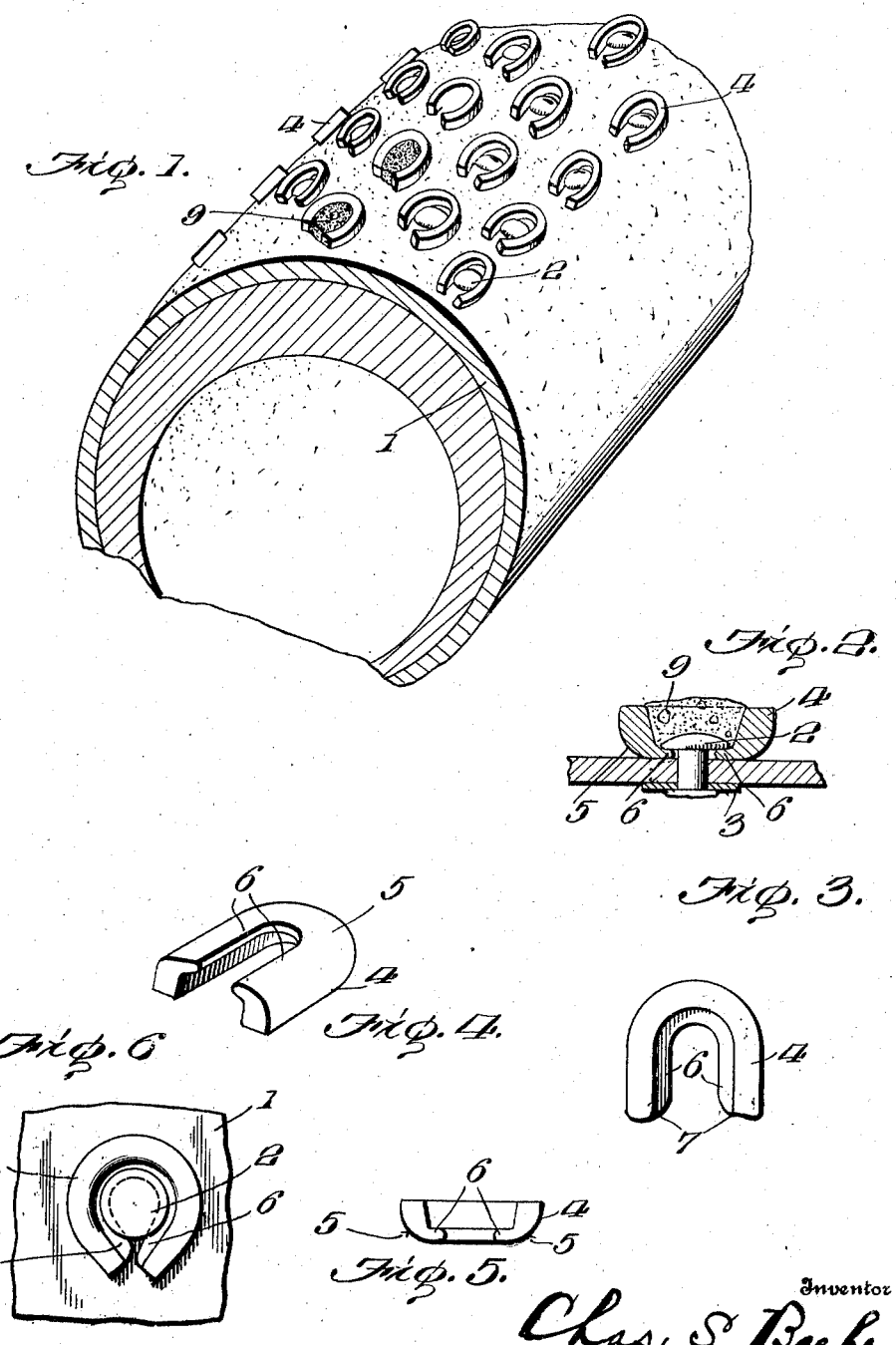

UNITED STATES PATENT OFFICE.

CHARLES S. BEEBE, OF RACINE, WISCONSIN, ASSIGNOR TO LUCIUS J. ELLIOTT, OF RACINE, WISCONSIN.

ANTISKID-TIRE AND STUD THEREFOR.

967,707.  Specification of Letters Patent.  Patented Aug. 16, 1910.

Application filed July 19, 1909. Serial No. 508,380.

*To all whom it may concern:*

Be it known that I, CHARLES S. BEEBE, a citizen of the United States, residing at Racine, Racine county, Wisconsin, have invented certain new and useful Improvements in Antiskid-Tires and Studs Therefor; and I do hereby declare the following to be a full, clear, and exact description of the invention, such as will enable others skilled in the art to which it appertains to make and use the same.

This invention relates to certain improvements in anti-skid tires and studs therefor; and the objects and nature of the invention will be readily understood by those skilled in the art in the light of the following explanation of the accompanying drawings illustrating what I now consider my preferred embodiment from among other formations and constructions within the spirit and scope of my invention.

It has been found in practice that the period or life of usefulness of certain types of pneumatic tires provided along their treads with projecting exterior anti-skidding or armor studs, is to a certain extent, limited by the life of the studs, or in other words, that the studs will wear out or wear off before the tire itself is worn out, thereby rendering the tire practically useless, or requiring (if it be practical to do so) dismantling or separation of the tire from its shoe, tread or cover, removal of the worn studs or rivets, application of new studs or rivets and reassembling of the parts of the tire.

It is an object of the invention to provide attachable or renewable heads or wearing surfaces for anti-skidding studs or rivets, which can be readily applied to stud or rivet heads and which can themselves be renewed as they wear out, whereby the anti-skidding studs of tires can be indefinitely renewed as they wear out so that the cover or tread of the tire can be used until rendered useless by wear without having its period of service limited to the life of the anti-skidding studs thereof.

A further object of the invention is to provide an anti-skidding stud which can be readily applied to tire rivets, and which is so formed as to provide a dirt cup, socket or receptacle in which soil, dust or the like from the road will collect and tightly pack to form a wearing or protective surface or body.

A further object of the invention is to provide a new article of manufacture consisting of an open or approximately U-shaped anti-skidding stud adapted to be slipped laterally onto the head of the tire rivet and then clipped thereon by bending to embrace the rivet head.

The invention consists in the article, in the combination and arrangements, substantially as set forth.

Referring to the accompanying drawings:—Figure 1, is a sectional perspective of a portion of a tire cover or tread armored with tire rivets provided with my improved attachable anti-skidding studs, some of the studs holding a tightly compressed body of soil, and others being shown without the soil. Fig. 2, is a sectional view through a stud applied to a rivet, showing the earth in the stud. Fig. 3, is a top plan view enlarged of a stud before being applied and clipped. Fig. 4, is a bottom perspective thereof. Fig. 5, is an edge elevation thereof enlarged. Fig. 6, is a detail plan of a stud applied to and compressed on a tire rivet head.

In the drawings, I show a portion 1, of a leather (or other suitable material) tread or shoe of, or for, a pneumatic tire, the crown or ground engaging portion of which is studded with rivets passed inwardly and transversely through said tread with heads 2, at the outer surface of the tire tread, and with the rivets at their inner ends suitably clenched or otherwise secured. For instance, I show the inner ends of the rivets passed through and clenched or upset on washers 3, and thereby securely fastening the rivets in the tire tread with their heads at the outer surface thereof. In the specific example illustrated, the rivet heads 2, are approximately flat, being slightly rounded and comparatively thin or small although I do not wish to thus limit my invention as the permanent rivet heads can be of any suitable size, shape or formation permitting application of the attachable anti-skidding studs thereto.

The anti-skidding studs of my invention are adapted for application to the exterior rivet heads, and in the particular example illustrated, each stud consists of a single integral U or horse shoe shaped block or body 4, of suitable hard metal of such malleability that it can be clipped or bent as hereinafter described. The body is rounded or semi-circular at the closed end with two approximately parallel legs extending therefrom and spaced apart a sufficient distance to receive the rivet head 2, between them. At its inner side the body is rounded outwardly and upwardly, see 5, and at its inner edges has the inwardly projecting flange 6, extending longitudinally of the inner edges of the legs and closed end of the body and being beveled or tapered off at the outer ends of the legs to form a tapered entrance opening 7 into the body. The body is hence approximately L-shaped in cross section and as though formed by an L shaped or angular bar bent into U-shape although these attachable studs can be formed by castings, drop forging, bending metal bars or otherwise. The studs are driven laterally onto the rivet heads with the shoulders or flanges thereof caught under the rivet heads, said flanges wedging tightly between the outer surface of the tire tread and the under faces of the rivet heads. The studs are driven onto the rivet heads until said heads are completely seated in the closed ends of the heads and then the opposite ends or legs of each stud are closed together or approximately together, by any suitable implement, thereby clipping the studs on and completely inclosing the rivets.

The studs can be formed of any suitable vertical length or thickness to project the desired distance outwardly beyond the surface of the tire tread and to form cups or sockets of any suitable depth opening outwardly beyond the rivet heads and closed at their inner ends by the rivet heads. The attachable studs, thus form cups or sockets which pick up and gather dust, soil or dirt from the road, and the dirt fills and is tightly packed and compressed in these cups, forming a hard wear resisting body 9, in each stud. The bodies 9, relieve the attachable studs of much of the wear, and when a stud is so worn that it will no longer hold and retain a body of dirt or soil therein, such stud can by a suitable implement, have its legs spread so that the worn stud can be removed from the rivet head and a new stud be clipped thereon. The rounded inner ends or faces of the studs not only preventing cutting or damaging of the tire tread but also aid in wedging and driving the studs on the rivet heads.

It is obvious that various changes in form, shape and dimensions, and that variations and modifications in the modes of application might be resorted to without departing from the spirit and scope of my invention, hence I do not wish to limit myself to the exact construction shown.

What I claim is:—

1. An approximately U-shaped attachable anti-skidding stud for tires, the ends of the stud adapted to be bent toward each other for securing the stud.

2. An attachable compressible anti-skidding stud for tires having a side entrance opening, said stud being approximately L-shaped in cross section.

3. A headed tire rivet provided with an anti-skidding stud embracing said head and projecting outwardly beyond the same to form a dirt cup closed at its inner end by said head, said stud having an opening to receive said head and being compressed to close said opening against passage of the head.

4. An anti-skidding stud composed of an approximately U-shaped body rounded at the inner face and having an inner rivet-head engaging flange and a flared entrance opening.

5. A tire provided with anti-skidding studs, and means for securing said studs to the tire, said means being protected against wear by the studs, each stud having ends adapted to be bent for permitting separation of the stud from its securing means.

6. A tire anti-skidding stud having a side entrance opening, said stud being compressible to approximately close said opening.

7. A headed tire rivet in combination with an anti-skidding stud having a side entrance opening and adapted to be slipped laterally around the rivet head and to be compressed thereon.

8. A tire anti-skidding stud having an internal tire rivet-head-receiving socket and shoulder and formed with a side entrance opening into said socket.

9. A tire having exterior rivet heads, and anti-skidding studs fitted between said heads and the tire and embracing and projecting beyond said heads to form dirt receiving cups, each stud having a rivet head entrance opening approximately closed by bending the stud.

10. A headed tire rivet, in combination with an anti-skidding stud embracing the head of said rivet and having an internal rivet head receiving socket and shoulder and a side entrance opening closed by bending the stud to secure the same on the rivet head.

11. A tire having rivets provided with permanent heads arranged exteriorly of the tire tread, said rivets at their inner ends within the tire provided with washers secured thereon, and anti-skidding wear studs seated on the outer surface of the tire tread and lapping under and secured by said rivet heads, and having ends bent to secure the studs to the heads.

12. A tire having stud-securing rivets projecting therefrom along its tread portion and provided with exterior permanent heads, washers within the tire and on the inner ends of said rivets and secured by upsetting, and tire protecting studs arranged along the tire tread and secured thereto by said rivet heads, each stud being expansible by bending for detachment from its securing rivet head.

13. A tire having permanent rivets fixed therein and projecting outwardly therefrom and along the exterior of the tire having permanent heads, and exterior detachable anti-skidding tire studs seated on the outer surface of the tire and separable from and secured down thereon by said rivet heads, said studs having road-contacting portions projecting outwardly beyond said heads and forming dirt receiving cups.

14. A tire having a leather tread and provided with a multiplicity of rivets permanently secured thereto and having permanent heads at the exterior thereof, and detachable anti-skidding studs seated on said tread and wedged between the same and said heads, each stud embracing the rivet head securing the same and having an outwardly projecting road contacting portion.

15. A tire having washers arranged therein and between the plies thereof, rivets passed through said washers and upset thereon and secured in the tire thereby and at their outer ends having permanent flat heads at the exterior of and arranged along the tire tread, and detachable anti-skidding studs arranged along the tire tread and having portions lapping under said rivet heads, whereby the studs are secured to the tire by said heads, each stud being rendered detachable from its head by bending.

16. A tire having stud securing heads arranged along its tread, and expansible detachable anti-skidding studs seated on the tire tread and lapping under said heads and thereby held and secured.

17. A tire having securing means arranged along its tread, and detachable anti-skidding studs arranged along said tread, each stud having a securing flange wedged under securing means for fastening the stud to the tire and being detachable therefrom by bending.

18. A tire having detachable anti-skidding studs arranged along its tread, and permanent means securing said studs to the tire, each stud forming a cup shaped depression and being expansible for detachment from its securing means.

In testimony whereof I affix my signature, in presence of two witnesses.

CHAS. S. BEEBE.

Witnesses:
L. WURZBERGER,
GEO. G. DAVIES.